(12) United States Patent
Ojima et al.

(10) Patent No.: US 10,094,938 B2
(45) Date of Patent: Oct. 9, 2018

(54) SCINTILLATOR PLATE AND RADIATION DETECTOR INCLUDING THE SAME

(71) Applicant: CANON KABUSHIKI KAISHA, Tokyo (JP)

(72) Inventors: Tetsunori Ojima, Kawasaki (JP); Minoru Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/659,367

(22) Filed: Jul. 25, 2017

(65) Prior Publication Data

US 2018/0031713 A1  Feb. 1, 2018

(30) Foreign Application Priority Data

Jul. 28, 2016  (JP) .................. 2016-148215

(51) Int. Cl.
*G01T 1/202* (2006.01)
*G21K 4/00* (2006.01)

(52) U.S. Cl.
CPC .......... *G01T 1/202* (2013.01); *G21K 2004/06* (2013.01)

(58) Field of Classification Search
CPC ..................................... G01T 1/202
See application file for complete search history.

(56) References Cited

U.S. PATENT DOCUMENTS

| 6,996,209 | B2* | 2/2006 | Marek | C09K 11/616 250/370.11 |
| 2007/0125984 | A1* | 6/2007 | Tian | C09K 11/025 252/301.4 S |
| 2007/0246662 | A1* | 10/2007 | Tahon | C09K 11/7733 250/484.4 |

FOREIGN PATENT DOCUMENTS

JP  2000-9845 A  1/2000

\* cited by examiner

*Primary Examiner* — Yara B Green
(74) *Attorney, Agent, or Firm* — Canon USA, Inc., IP Division (57) ABSTRACT

A protection film, configured to cover scintillators formed on a scintillator substrate, the scintillators being a plurality of columnar crystal structures protruding from a surface of the scintillator substrate, at least includes a metal alkoxide, and a cross-link formed by cross-linking some of metal atoms of the metal alkoxide by oxygen.

9 Claims, 4 Drawing Sheets

SCINTILLATOR PLATE AND RADIATION DETECTOR INCLUDING THE SAME

BACKGROUND OF THE INVENTION

Field of the Invention

The present disclosure relates to a scintillator plate and a radiation detector including the scintillator plate.

Description of the Related Art

Radiation detectors used for radiography or the like in a medical field include a scintillator that emits fluorescence upon receiving radiation, a scintillator plate including a scintillator substrate that holds the scintillator, and a photoelectric conversion unit including pixels that detect the fluorescence emitted from the scintillator. The pixels are each a photoelectric conversion element that receives the fluorescence and converts the received fluorescence into an electric signal. The scintillator is required to have a configuration with which the emitted fluorescence can be efficiently transmitted to a light receiving surface of the pixels. For this reason, scintillators having columnar crystal structures (also referred to as needle structures) have been used. The scintillators having the columnar crystal structures have gaps formed therebetween, and are made of a material with a higher refractive index than that of air. Thus, repetitive total reflection of the fluorescence is achieved in the columnar crystal structures. The fluorescence, generated based on radiation incident on one end of the columnar crystal structures, is expected to travel in the columnar crystal structures to be emitted from the other end to efficiently reach the light receiving surface.

The columnar crystal structures have a high aspect ratio, and have an extremely larger specific surface area than a planer film. Alkali halide crystals, such as CsI, are widely used as a material of the scintillators. It is widely known that the alkali halide crystals show deliquescency. Therefore, the scintillators in the columnar crystal structures made of the alkali halide crystal are apt to deliquesce and deteriorate upon being exposed to the atmosphere due to moisture in the atmosphere. In the columnar crystal structures with the alkali halide deteriorated, the generated fluorescence is scattered before reaching pixels, resulting in degradation of a spatial resolution of a radiation detector. Japanese Patent Application Laid-Open No. 2000-9845 discusses a scintillator panel having a columnar crystal structure of scintillators covered with a protection film made of polyparaxylylene, so that the scintillators can be prevented from coming into contact with moisture to deliquesce.

The protection film made of polyparaxylylene covering the scintillators to prevent the scintillators from deliquescing as discussed in Japanese Patent Application Laid-Open No. 2000-9845 needs to be thick enough to fill gaps between the columnar crystal structures. This is because the gaps would be an entrance for the moisture to come into contact with the scintillators to cause the deliquescing of the scintillators.

If the protection film of the scintillators is thick enough to fill the gap between the columnar crystal structures, a radiation detector has a lower spatial resolution for the following reason. The fluorescence emitted from the scintillators freely spreads in the protection film upon being transmitted into the protection film. Therefore, in the configuration with the protection film provided between the scintillators and the photoelectric conversion unit, as the protection film is thicker, a larger amount of the fluorescence, emitted from the scintillator, spreads before reaching the photoelectric conversion unit. The fluorescence emitted from one columnar crystal structure may be transmitted to an adjacent columnar crystal structure through the protection film, thereby spreading before reaching the photoelectric conversion unit, when the protection film is provided to fill the gaps. As a result, the spatial resolution of the radiation detector is lowered. As a result thereof, the scintillators covered with the protection film can be prevented from deteriorating due to deliquescing, but the radiation detector including such scintillators has a low spatial resolution due to the spreading of the fluorescence emitted from the scintillator. A protection film thin enough not to fill the gaps between the columnar crystal structures may be employed to prevent the spatial resolution from being lowered. However, the conventional protection film with a reduced thickness has been unable to effectively prevent the scintillators from deliquescing.

SUMMARY OF THE INVENTION

In view of the above, the present disclosure is directed to a scintillator plate in which a protection film is thinner but can prevent scintillators having columnar crystal structures from deteriorating and prevent fluorescence generated in the scintillators from spreading. The present disclosure is further directed to a radiation detector using the scintillator plate so that a high spatial resolution can be guaranteed for a long period of time.

According to an aspect of the present disclosure, a scintillator plate includes a scintillator substrate, scintillators formed on the scintillator substrate, the scintillators being a plurality of columnar crystal structures protruding from a surface of the scintillator substrate, and a protection film configured to cover the scintillators. The protection film at least includes a metal alkoxide, and a cross-link formed by cross-linking part of metal atoms of the metal alkoxide by oxygen.

According to another aspect of the present disclosure, a radiation detector includes the scintillator plate described above, and a photoelectrical conversion unit.

Further features of the present disclosure will become apparent from the following description of exemplary embodiments with reference to the attached drawings.

DESCRIPTION OF THE EMBODIMENTS

Figure 1:
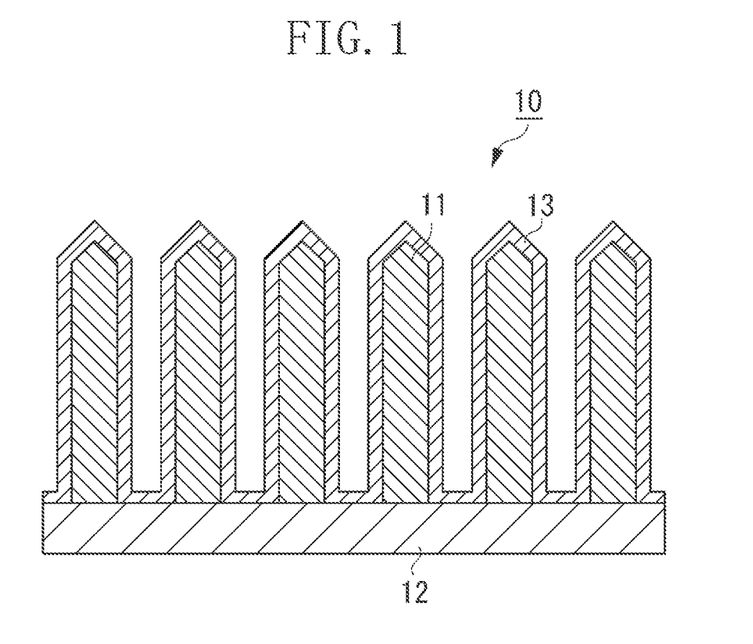
FIG. 1 is a schematic cross-sectional view of a scintillator plate according to an exemplary embodiment.

An exemplary embodiment is described in detail below with reference to the drawings. It should be noted that the present invention is not limited to the exemplary embodiment described below. Appropriate modifications, improvements, and the like of the exemplary embodiment described below, can be ascertained based on a general knowledge of a person skilled in the art. FIG. 1 is a schematic cross-sectional view of a scintillator plate according to one exemplary embodiment. This scintillator plate 10 includes scintillators 11 that each emit fluorescence upon receiving radiation, a scintillator substrate 12 that holds the scintillators 11, and a protection film 13 that covers the scintillators 11. Configurations of the scintillator plate 10 are described below in detail, and then a radiation detector including the scintillator plate 10 is described.

Protection Film

A feature of the scintillator plate 10 is that the protection film 13, covering the scintillators 11, at least includes a metal alkoxide and a cross-link formed by cross-linking some of metal atoms of the metal alkoxide by oxygen. Through an experiment, the present inventors have found that this feature prevents water molecules from affecting the scintillator 11 even when the protection film is thin. This is because the protection film 13 including the metal alkoxide and the cross-link thereof has an effect of repelling water molecules, an effect of capturing/consuming water molecules, or both. Conventional protection films only have the repelling effect against water molecules. Thus, water molecules that have entered the structure stays in the structure, causing the deterioration of the scintillator 11 in contact with the water molecules. In contrast, water molecules can be consumed by a metal alkoxide being in contact with the water molecules. More specifically, the metal alkoxide reacts with water molecules to cause hydrolysis, and a hydroxyl group bonded to metal atoms and alcohol molecules are generated. As described above, with the protection film 13, even water molecules that have transmitted through the protection film 13 to reach the scintillator 11 can be captured/consumed, whereby the influence of the water molecules on the scintillator 11 can be reduced. Thus, deterioration of the scintillator 11 can be sufficiently prevented, even when the protection film 13 is thin. Such an effect can be expected not only with a metal alkoxide, but also with a derivative obtained from metal through substitution using halogen, an amino group, and hydrogen atoms thereof for metal or metal to which acetylene is bonded that also reacts with water to cause hydrolysis so that a hydroxyl group bonded to metal atoms is generated. The cross-link in the protection film 13 preferably has a molar ratio of 0.02 to 1 as a stoichiometric ratio of an alkoxide atom group to the metal atoms. The amount of alkoxide can be controlled by adjusting activation of reaction occurring when the metal alkoxide is cross-linked. More specifically, as an amount of the activated metal alkoxide is increased, an amount of alkoxide in the cross-link as the product is smaller. An alkoxide in a compound can be qualitatively analyzed with Fourier transform infrared spectroscopy (FTIR), Time of Flight Secondary Ion Mass Spectrometry (TOF-SIMS), or the like, and can be quantitatively analyzed with FTIR, X-ray photoemission spectroscopy (XPS), or the like. To perform the quantitative analysis with XPS, a compound with no C other than alkoxides needs to be prepared. To perform the quantitative analysis with FTIR, the quantitative analysis with XPS is first performed with a compound, including an alkoxide as only C, prepared to quantitively analyze the amount of alkoxide. Then, the quantitative analysis with FTIR is performed to generate a calibration curve with which the alkoxide is quantitatively analyzed. An excessively large amount of alkoxide relative to metal atoms is unfavorable because an amount of cross-links in the protection film 13 is decreased, and the protection film 13 has a low strength and a low density, rendering the transmission of water molecules easier. If an amount of alkoxide is excessively small, the effect of capturing/consuming water molecules is reduced, and thus the effect of preventing the deterioration of the scintillator 11 is compromised. For this reason, the alkoxide in the cross-links is preferably adjusted to an appropriate amount. The protection film 13 preferably has a thickness of 100 nm or smaller. A large part of fluorescence generated in the scintillator is guided and transmitted in the scintillator, due to a refractive index difference between the scintillator and air. The refractive index difference between the scintillator and the protection film is relatively small. Thus, fluorescence in the scintillator in contact with the protection film can be easily transmitted into the protection film. When air surrounds the protection film, total reflection of fluorescence occurs at an interface between the protection film and air. The fluorescence generated in the scintillator is guided in a structure as a combination of the scintillator and the protection film. When the protection film completely fills the gaps between the columnar crystal structures as the scintillators, the fluorescence spreads from one columnar crystal structure to an adjacent columnar crystal structure. On the other hand, the fluorescence is less likely to spread between the columnar crystal structures adjacent to each other when the gaps are provided. The film thickness is preferably 100 nm or smaller, because a gap between portions around distal ends of the columnar crystal structures described below has a length of 200 nm or more. The columnar crystal structures do not have a uniform gap in between. Thus, the film thickness is preferably smaller, so that a slight gap that would otherwise be filled can remain unfilled. The protection film 13 has the effect of repelling water molecules or the effect of capturing/consuming water molecules while having a small thickness, so that the scintillator 11 can be less affected by water molecules. More specifically, the protection film 13 can have a thickness smaller than 100 nm. As a result, a large part of the fluorescence, generated in the scintillator 11, is guided in the scintillator 11 and in the protection film through repetitive total reflection or Fresnel reflection. Then, the fluorescence is emitted from the distal end of the scintillator 11 on a side opposite to a side irradiated with radiation, to be incident on a light receiving surface. The fluorescence is efficiently received at a portion around the foot of a perpendicular line from a light emission point (where the fluorescence is generated) to the light receiving surface. Thus, multiple optical interfaces guide the fluorescence toward the light receiving surface to prevent the fluorescence from spreading. As the protection film 13 is thin at the distal end of the scintillator 11, the fluorescence emitted from the distal end of the scintillator 11 is prevented from scattering and spreading in the protection film 13. As a result, the fluorescence generated in the scintillator 11 is efficiently emitted from the distal end of the scintillator 11 to be incident on the light receiving surface, whereby high spatial resolution can be achieved. As described above, the protection film is preferably thinner for guiding light because there are portions with small gaps. Still, when the protection film 13 is too thin, the water molecule repelling effect, the water molecule capturing/consuming effect, and the strength are compromised. Thus, the protection film 13 preferably has a thickness of 0.3 nm or larger. The protection film preferably reaches the base end of each of the columnar crystal structures as the scintillators. More specifically, the protection film at least extends for 100 μm from the distal end to the based end of each of the columnar crystal structures. A portion where the columnar crystal structures of the scintillator are in contact with each other or are close to each other needs not to be covered with the protection film even when the portion is not at the base end of the columnar crystal structures. A compound represented by the following General Formula (1) can be used as the metal alkoxide:

$$M1(OR)_n \qquad (1).$$

In Formula (1) described above, M1 is any one of Si, Al, Ti, and Zr, R is at least one selected from a methyl group, an ethyl group, a propyl group, an isopropyl group, and a butyl group, and n is four when M1 is Si, Ti, or Zr and is three when M1 is Al. A similar effect can be expected with atoms such as P, B, Hf, and Ta used as M1. The protection film 13 may include a hydroxyl group bonded to metal atoms. The water molecules can be captured with a hydroxyl group hydraulically bonded with the water molecules. Still, it is unfavorable that an excessively large amount of hydroxyl groups is included in the protection film 13, because hydrophilicity is high, and transmittance of water molecules is high. More specifically, the stoichiometric ratio of water molecules to metal atoms is 2.5 or lower, and is more preferably 2 or lower.

The protection film 13 may include hydrogen atoms bonded to metal atoms. When a proportion of metal atoms is large in a structure in which all the metal atoms are bonded to other metal atoms via oxygen, a structural distortion leading to a crack might occur in the protection film 13. Thus, hydrogen atoms are included so that metal atoms not bonded to the other metal atoms but bonded to hydrogen atoms can be provided, whereby generation of the crack can be prevented. Still, when there are too many metal atoms bonded to hydrogen atoms, the structure of the protection film 13 involves a large amount of small gaps. In view of the above, the stoichiometric ratio of the hydrogen atoms in the protection film 13 to the metal atoms is 1 or lower.

Forming Protection Film

The protection film 13 can be formed with the metal alkoxide being in contact with and reacting with the scintillator 11 having a columnar crystal structure supported by the scintillator substrate 12. The reaction for forming the film can be promoted by activating the metal alkoxide. The activation can be achieved with heat, plasma, chemical reaction, or the like. With the metal alkoxide appropriately activated, the protection film 13 can reach the base end of each of the scintillators 11 as the columnar crystal structures, and thus is expected to prevent the scintillator from deteriorating even if a film is thinner.

Scintillator

The scintillators 11 include a plurality of columnar crystal structures formed on and protruding from the surface of the scintillator substrate 12, and generate fluorescence upon being irradiated with radiation such as X-rays. More specifically, the scintillator 11 is a phosphor that absorbs energy of radiation, such as X-rays, incident thereon and emits light with a wavelength in a range of 300 nm to 800 nm, including visible light, ultraviolet light, and infrared light. The columnar crystal structures preferably have a longitudinal axis orthogonal to the scintillator substrate 12. The longitudinal axis may not be strictly orthogonal and may be inclined. The longitudinal axis not being strictly orthogonal does not largely have an affect. The fluorescence generated in the scintillator 11 needs to travel in the scintillator 11 in such a manner as to be guided to the light receiving surface. For this reason, an angle between the longitudinal axis of each scintillator 11 and the perpendicular line on the scintillator substrate 12 is preferably smaller than 45°. The plurality of scintillators 11 may not be uniformly inclined. The plurality of scintillators 11 includes multiple optical interfaces inclined with respect to a perpendicular line on the scintillator substrate 12 by an angle smaller than 45°. As described above, the protection film 13 is thin and thus the optical interface between the scintillator 11 and the protection film 13 is substantially the same as the optical interface between the scintillator 11 and air, whereby the fluorescence is prevented from spreading. The scintillator may have any columnar crystal structure such as a cylindrical structure or a polygonal columnar structure. The columnar crystal structures need not to have a uniform shape. More specifically, the plurality of scintillators 11 may include scintillators 11 in a cylindrical shape and scintillators 11 in a polygonal columnar shape. The scintillators 11 need not to have the same thickness. The plurality of scintillators 11 may include scintillators 11 having different thicknesses. The scintillators 11 each preferably have a thickness that is equal to or larger than 0.1 µm and equal to or smaller than 50 µm, and more preferably have a thickness that is equal to or larger than 0.1 µm and equal to or smaller than 15 µm. When the thickness of the scintillator 11 is smaller than 0.1 µm, the thickness of the scintillator 11 is very small relative to the wavelength of the fluorescence generated in the scintillator 11, and thus geometrical light diffraction or optical diffusion is less likely to occur. As a result, the fluorescence is difficult to be effectively guided to the light receiving surface, and might spread outside the scintillator 11. This results in a radiation detector with a low spatial resolution. In theory, a resolution finer than the thickness of the scintillators 11 is difficult to achieve with the scintillator plate 10. Thus, when the scintillator 11 has a thickness of 50 µm or larger might, a spatial resolution is lowered not only in a high spatial frequency band of about 10 LP/mm, but also in a low spatial frequency band of about 1 LP/mm. Each of the scintillators 11 needs not to have a uniform thickness. Preferably, a difference in the thickness over the distal end and the base end of the scintillator 11 is preferably equal to or smaller than 50 µm. The columnar crystal structures include a needle structure with a pointy distal end. When each of the scintillators 11 has a needle structure, the distal end (an end on a side opposite to a side to be in contact with the scintillator substrate 12) may be thinner than other portions by more than 50 µm. A cross-sectional shape needs not to be uniform from one end to the other end. For example, the scintillator 11 may have a shape gradually changing from a polygonal column shape at a portion close to the scintillator substrate 12 to the cylindrical shape as the distance from the scintillator substrate 12 increases. Variation among the lengths (height) of the scintillators 11, corresponding to the length of the longitudinal axis of the columnar crystal structures, is preferably small. More preferably, there is no variation among the lengths (uniform length). Still, the length does not necessarily need to be uniform, and the plurality of scintillators 11 may include short scintillators 11 and long scintillators 11. This is because light leaked from the end of the short scintillator 11 can enter an adjacent scintillator 11 to travel therein toward the light receiving surface. Thus, the guiding of fluorescence can be achieved with the fluorescence prevented from spreading, with the plurality of scintillators 11 having different lengths. The length of the scintillator 11 does not largely have an impact, and the benefit can be sufficiently obtained regardless of the length of the scintillator 11. Thus, the length of the scintillator 11 is not particularly limited. Still, the length is preferably equal to or larger than 100 nm and equal to or smaller than 10 cm, considering a realistic manufacturing process. More preferably, the length of the scintillator 11 is equal to or larger than 1 μm and equal to or smaller than 1 cm. Preferably, the scintillators 11 are independent columnar crystal structures that are separated from each other by a distance of 200 nm or larger and 1 μm of smaller. Alternatively, the scintillators 11 may not be completely separated from each other, and the optical interfaces may be intermittently provided in a direction orthogonal to surfaces of the columnar crystal structures as the scintillators 11. The fluorescence can be guided with the scintillator 11 also when the optical interfaces are intermittently provided. The scintillator 11 may include a plurality of gaps or light scattering members. The fluorescence scattered by the gaps and the light scattering members can enter adjacent scintillators 11 and travel therein toward the light receiving surface. As long as this condition is satisfied, the fluorescence can be guided in the scintillators 11 including the gaps or the light scattering members. The scintillator 11 may have a flat distal end so that smaller unevenness with respect to the light receiving surface can be achieved, whereby the fluorescence can be expected to be efficiently received by the light receiving surface. The scintillator 11 may be made of a material selected from various known materials used for scintillators. The scintillator 11 is covered with the thin protection film 13 to be less affected by water molecules, and thus may be made of a material that deteriorates upon being in contact with water molecules. More specifically, compounds that deliquesce may be used, and a metal halide is one of such compounds that is preferably used. The metal halide deliquesces and deteriorates upon being exposed to the atmosphere. As a result, the fluorescence traveling in the scintillator 11 spreads outside the scintillator 11, resulting in a degradation of the spatial resolution of the radiation detector. The above can be suitably applied to the scintillator 11 made of a material involving a risk of deterioration, other than deliquescing, as a result of being in contact with water molecules, resulting in degradation of the spatial resolution of the radiation detector. A typical metal halide material includes alkaline halide such as CsI. With CsI, X-rays can be converted into visible light with high efficiency, the scintillators 11 as the columnar crystal structures can be easily formed by deposition, and the scintillators 11 with a long length can be achieved. A sufficient light emitting efficiency cannot be achieved with CsI alone, and thus an augmenting agent is added. Examples of the augmenting agent that can be used include NaI, In, Tl, Li, K, Rb, and Na. As a raw material of a CsI scintillator including Tl, an additive including one or more types of Tl compounds and CsI may be used. CsI and Tl preferably have a light emitting wavelength in a wide range of 400 nm to 750 nm. As the additive including one or more types of Tl compounds, monovalent and trivalent compounds may be used. Example of such a compound include TlI, TlBr, TlCl, TlF, and $TlF_3$. The content of the augmenting agent is preferably adjusted to be an amount optimum for a target performance, and is preferably 0.01% by mole to 20% by mole with respect to CsI. A material other than CsI that can be used for the scintillator 11 includes an alkaline halide represented by the following General Formula (2):

$$M2X1 \cdot \alpha M3X2_2 \cdot \beta M4X3_3 : \gamma A1 \qquad (2).$$

In Formula (2) described above, M2 is at least one alkali metal atom selected from Li, Na, K, Rb, and Cs, M3 is at least one divalent metal atom selected from Be, Mg, Ca, Sr, Ba, Zn, Cd, Cu, and Ni, M4 is at least one trivalent metal atom selected from Sc, Y, La, Ce, Pr, Nd, Pm, Sm, Eu, Gd, Tb, Dy, Ho, Er, Tm, Yb, Lu, Al, Ga, and In, each of X1, X2, and X3 is at least one halogen atom individually selected from F, Cl, Br, and I, A1 is at least one metal atom selected from Eu, Tb, In, Bi, Ce, Tm, Dy, Pr, Ho, Nd, Yb, Er, Gd, Lu, Sm, Y, Tl, Na, Ag, Cu, and Mg, and α, β, and γ represent numerical values in ranges of 0≤α<0.5, 0≤β<0.5, and 0<γ≤0.2, respectively.

The scintillator 11 may be made of a halide compound as a material other than the alkali halide. More specifically, a rare earth activated alkaline earth metal fluoride halogen compound represented by the following General Formula (3) may be used:

$$M5FX4 : \delta A2 \qquad (3)$$

In the Formula (3) M5 is at least one alkaline earth metal atom selected from Ba, Sr, and Ca, A2 is at least one rare-earth atom selected from Ce, Pr, Sm, Eu, Tb, Dy, Ho, Nd, Er, Tm, and Yb, X4 is at least one halogen atom selected from Cl, Br, and I, and δ is a numerical value in a range of 0<δ≤0.2.

The scintillator 11 may include a compound, other than the halide compound described above, examples of which include a LnTaO4:(Nb,Gd)-based compound, a Ln2SiO5:Ce-based compound, a LnOX:Tm-based compound (Ln representing a rare-earth element), Gd2O2S:Tb, Gd2O2S:Pr, Ce, ZnWO4, LuAlO3:Ce, Gd3Ga5O12:Cr, and HfO2.

Scintillator Substrate

The scintillator substrate 12 is a solid member that can support the plurality of scintillators 11. The scintillator substrate 12 may be a substrate made of a material including metal and an oxide thereof, a semiconductor and an oxide thereof, glass, and resin, as well as a device such as a photodetector made of these.

Radiation Detector

Figure 2:
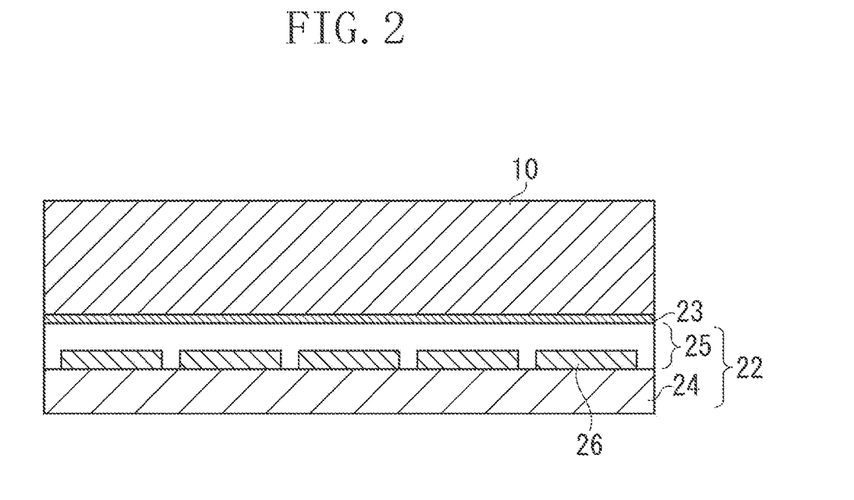
FIG. 2 is a schematic cross-sectional view of a radiation detector according to the exemplary embodiment.

A radiation detector including the scintillator plate 10 is described with reference to FIG. 2. FIG. 2 is a cross-sectional view of the radiation detector including the scintillator plate 10. The radiation detector includes the scintillator plate 10 and a photoelectrical conversion unit 22. In FIG. 2, the scintillator plate 10 is arranged in such a manner that the scintillator substrate 12 illustrated in FIG. 1 is disposed on the outer side. An adhesion layer 23 may be provided between the scintillator plate 10 and the photoelectrical conversion unit 22. The adhesion layer 23 may have a function of integrating the scintillator plate 10 and the photoelectrical conversion unit 22, and may also have functions of protecting the scintillator plate 10, protecting the photoelectrical conversion unit 22, and establishing optical connection between the scintillator 11 and the light receiving surface of the photoelectrical conversion unit 22. The adhesion layer 23 may include two or more layers made of different materials. The photoelectrical conversion unit 22 is formed of a photodetector layer 25 provided on a substrate 24. A plurality of light receiving unit 26 is arranged in the photodetector layer 25. The radiation detector may be manufactured by attaching the scintillator plate 10 to the photoelectrical conversion unit 22. A method for manufacturing the radiation detector may include forming the scintillators 11 directly or indirectly (via a protection layer or the like) on the photoelectrical conversion unit 22, forming the protection film 13, and attaching the scintillator substrate 12 to a side of the scintillators 11 opposite to the photoelectrical conversion unit 22 performed in this order. Preferably, for the sake of easiness, the method for manufacturing the radiation detector include forming the scintillators 11 on the scintillator substrate 12, forming the protection film 13 to complete the scintillator plate 10, and attaching the scintillator plate 10 to the photoelectrical conversion unit 22, performed in this order. A reflection layer may be provided on a surface of the scintillator plate 10 opposite to a surface in contact with the photoelectrical conversion unit 22. About half of the fluorescence generated in the scintillator plate travels toward the surface in contact with the photoelectrical conversion unit 22. The remaining half of the fluorescence travels toward the opposite surface. The reflection layer can reflect the remaining half of the fluorescence so that the fluorescence can travel toward the photoelectrical conversion unit 22, whereby an amount of fluorescence reaching the photoelectrical conversion unit 22 can be increased. As a result, the reflection layer can be provided to achieve a higher sensitivity of the radiation detector to radiation.

Scintillators were formed on a Si substrate by thermal deposition. A heating boat in a vacuum container was filled with CsI raw material powder, and the Si substrate was attached to a spinning disk while facing the boat. A high vacuum state of $1.0 \times 10^{-3}$ Pa or lower was achieved in the vacuum container with a vacuum pump, and the temperature of the boat was set to 670° C. Another boat was provided in the vacuum container and filled with TlI raw material powder as a luminescent center, and was heated to be used for simultaneous film formation. The scintillators were formed on the Si substrate rotating at 60 rpm. Then, appropriately activated ethyl silicate was brought into contact with the scintillators, whereby a protection film was formed on surfaces of the scintillators. Thus, a scintillator plate according to Example 1 was obtained. A scintillator plate according to Comparative Example 1 was obtained through processes that are same as those for Example 1 except that the protection film was not formed. A scintillator plate according to Comparative Example 2 was obtained through processes that are same as those for Example 1 except that a thin protection film was formed by spraying fluorine coating agent ("3M Novec (registered trademark)" manufactured by 3M Company), generally used as moisture-proof coating agent, onto the scintillators. These samples obtained as described above were subjected to cross-sectional observation with a scanning electron microscope (SEM), surface element analysis with XPS, spectrum analysis with FTIR, and resolution evaluation based on Modulation Transfer Function (MTF) measurement performed with X-ray irradiation. The MTF measurement is described below. A general edge method was used for evaluating the resolution. X-rays with a radiation quality corresponding to RQA5 (radiation source: tungsten, tube voltage: 70 kV, tube current: 0.5 mA, filter: an aluminum filter with a thickness of 21 mm) were used. The MTF measurement was performed on the scintillator samples pressed against a charge-coupled device (CCD) with a fiber optic plate (FOP) and irradiated with X-rays for evaluation. The cross-sectional observation with the SEM indicated that there was almost no difference among the scintillator plates according to Example 1 and Comparative Examples 1 and 2 and that thickness was substantially the same among the scintillators. Thus, the thickness of the protection films according to each of Example 1 and Comparative Example 2 is estimated to be 50 nm or smaller. The scintillator according to Example 1 had a uniform appearance from the distal end to the base end, with the protection film provided over an area between the distal end and the base end. On the other hand, the scintillator according to Comparative Example 2 had an appearance changed on a side of the distal end with the protection film only covering the side of the distal end.

The following result was obtained by X-ray fluorescence analyzing on Example 1, Cs: 48.65 atomic percent, I: 51.01 atomic percent, and Si: 0.35 atomic percent. The thickness of the protection film is calculated to be 3.6 nm to 4.7 nm, under an assumption of the thickness and the length of the scintillator respectively being 10 μm and 500 μm, the density of CsI being 4.51 g/cm$^3$, and the density of the protection film being 2.2 g/cm$^3$ (the needle point and the area of the scintillator substrate are not taken into account). The following surface element ratio was obtained by the surface element analysis with XPS on Example 1 (in % by mole).

$C_{1s}$: 6.88
$O_{1s}$: 47.26
$Si_{2p}$: 14.59
$I_{3d5}$: 12.54
$Cs_{3d5}$: 18.74

The following compositions are assumed to be derived from the elements described above.
C: $Si(OC_2H_2)_4$
O: $SiO_2$, $Si(OH)_4$, $Si(OC_2H_2)_4$, $CsOHSi:SiO_2$, $Si(OH)_4$, $Si(OC_2H_2)_4$I: $CsICs:CsI$, $CsOH$ The ratio of each composition is calculated as follows based on the ratio of each element (in % by mole).
CsOH=18.74−12.54=6.2
O=6.88÷2=3.44 derived from $Si(OC_2H_2)_4$
O=47.26−3.44−6.2=37.62 derived from $SiO_2$ and $Si(OH)_4$
Si=6.88÷8=0.86 derived from $Si(OC_2H_2)_4$
Si=14.59−0.86=13.73 derived from $SiO_2$ and $Si(OH)_4$
O=37.62 and Si=13.73 derived from $SiO_2$ and $Si(OH)_4$
Thus, Si=8.65 derived from $SiO_2$
Si=5.08 derived from $Si(OH)_2$.

The following results can be obtained with calculations based on the ratios described above.
Ethoxide relative to Si=6.88÷2÷14.59=0.24 OH relative to Si=5.08×4÷14.59=1.39

Figure 3:
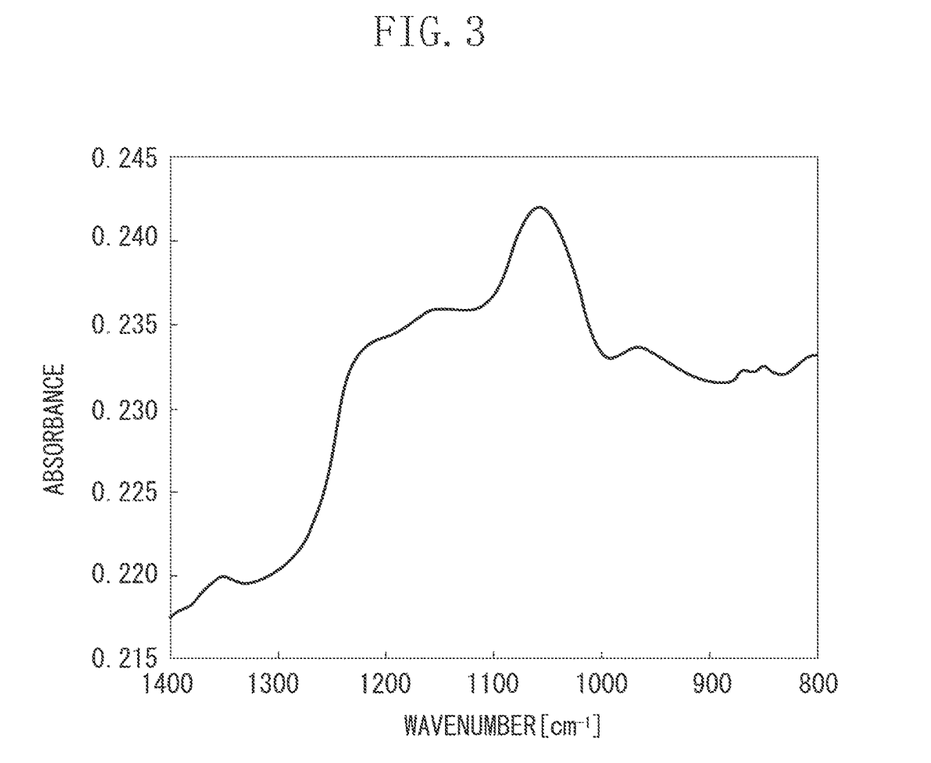
FIG. 3 illustrates a Fourier Transform Infrared Spectroscopy (FTIR) spectrum according to Example 1.
Figure 4:
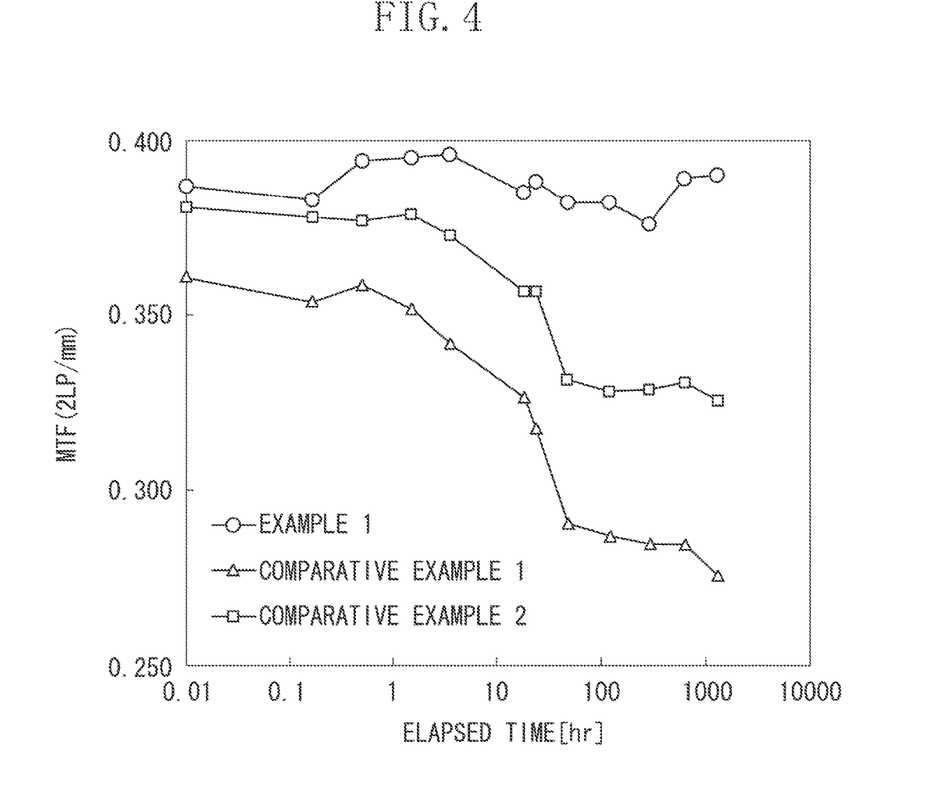
FIG. 4 illustrates how modulation transfer functions (MTF) of Example 1 and Comparative Examples 1 and 2 change over time.

FIG. 3 illustrates an FTIR spectrum according to Example 1. A peak corresponding to Si—O—O is at a point of 1055 cm$^{-1}$. Another peak, on a larger wavenumber side of the peak, corresponding to Si—O—C is at a point of 1150 cm$^{-1}$. Thus, it can be found that the protection film according to Example 1 includes ethoxide. FIG. 4 illustrates how the MTF of the scintillator plate according to each of Example 1 and Comparative Examples 1 and 2 changes over time, when the scintillator plates are stored at relative humidity (RH) of 55% and a temperature of 25° C. The samples according to Comparative Examples 1 and 2 showed reduction of the MTF over time, indicating the degradation of the spatial resolution, presumably because of the CsI deliquescing. This indicates that Comparative Example 2 with the protection film lacks sufficient deliquescing prevention performance, as is obviously the case with Comparative Example 1 with no protection film. This is presumably because the conventional protection film needs to be somewhat thick to sufficiently prevent the deliquescing. On the other hand, Example 1 showed almost no change in the MTF for 1000 hours and more. This is presumably because a thin protection film prevented the scintillator from deliquescing. Thus, in the scintillator plate, a thin protection film sufficiently prevented the scintillator from deliquescing.

With a thin protection film, the scintillator can be less affected by water molecules and thus can be prevented from deteriorating. Thus, the thickness of the protection film can be reduced compared with the conventional configuration to achieve an effect of reducing the amount of fluorescence, generated in a scintillator, transmitted into an adjacent columnar crystal structure while traveling to the distal end of the scintillator. The protection film covering the scintillator distal end is thin, whereby the amount of fluorescence scattering before reaching the light receiving surface of the pixels after being emitted from the distal end of the scintillator can be reduced. Thus, the fluorescence generated in the scintillator can be prevented from spreading and thus can efficiently be incident on the light receiving surface of a corresponding one of the pixels, whereby a radiation detector with a high resolution can be provided. The protection film prevents the scintillator from deteriorating, whereby the high spatial resolution of the radiation detector can be guaranteed for a long period of time.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-148215, filed Jul. 28, 2016, which is hereby incorporated by reference herein in its entirety.

What is claimed is:

1. A scintillator plate comprising:
a scintillator substrate;
scintillators formed on the scintillator substrate, the scintillators being a plurality of columnar crystal structures protruding from a surface of the scintillator substrate; and
a protection film configured to cover the scintillators,
wherein the protection film at least includes a metal alkoxide, and a cross-link formed by cross-linking some of metal atoms of the metal alkoxide by oxygen.

2. The scintillator plate according to claim 1, wherein an alkoxide atom group in the cross-links has a stoichiometric ratio of 0.02 to 1 to the metal atoms.

3. The scintillator plate according to claim 1, wherein the protection film has a film thickness of 0.3 nm or larger and 100 nm or smaller.

4. The scintillator plate according to claim 1, wherein the metal alkoxide is a compound represented by the following Formula (1):

$$M1(OR)_n \tag{1},$$

where M1 is any one of Si, Al, Ti, and Zr, R is at least one member selected from the group consisting of a methyl group, an ethyl group, a propyl group, an isopropyl group, and a butyl group, and n is four when M1 is Si, Ti, or Zr and n is three when M1 is Al.

5. The scintillator plate according to claim 1, wherein the columnar crystal structures have a thickness that is equal to or larger than 0.1 μm and equal to or smaller than 50 μm.

6. The scintillator plate according to claim 1, wherein the scintillator is at least made of a halide compound.

7. The scintillator plate according to claim 6, wherein the halide compound is alkali halide.

8. The scintillator plate according to claim 7, wherein the alkali halide is a compound represented by the following Formula (2):

$$M2X1 \cdot \alpha M3X2_2 \cdot \beta M4X3_3 \cdot \gamma A1 \tag{2},$$

where M2 is at least one alkali metal atom selected from the group consisting of Li, Na, K, Rb, and Cs, M3 is at least one divalent metal atom selected from the group consisting of Be, Mg, Ca, Sr, Ba, Zn, Cd, Cu, and Ni, M4 is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga, and In, each of X1, X2, and X3 is at least one halogen atom individually selected from the group consisting of F, Cl, Br, and I, A1 is at least one metal atom selected from the group consisting of Eu, Tb, In, Bi, Ce, Tm, Dy, Pr, Ho, Nd, Yb, Er, Gd, Lu, Sm, Y, Tl, Na, Ag, Cu, and Mg, and α, β, and γ represent numerical values in ranges of $0 \leq \alpha < 0.5$, $0 \leq \beta < 0.5$, and $0 < \gamma \leq 0.2$, respectively.

9. A radiation detector comprising:
the scintillator plate according to claim 1; and
a photoelectrical conversion unit.

* * * * *